Patented Jan. 23, 1923.

1,443,077

UNITED STATES PATENT OFFICE.

ANDRÉ HELBRONNER, OF PARIS, AND PIERRE PIPEREAUT, OF NANTES, FRANCE.

PROCESS OF PRODUCING SULPHIDES.

No Drawing.  Application filed February 28, 1918.  Serial No. 219,741.

*To all whom it may concern:*

Be it known that we, ANDRÉ HELBRONNER and PIERRE PIPEREAUT, citizens of the Republic of France, residing at Paris, France, and Nantes, France, respectively, have invented certain new and useful Improvements in Processes of Producing Sulphides (for which we have filed an application in France Nov. 17, 1917), of which the following is a full, clear, and exact description.

This invention relates to a process for the manufacture of sulphides, which process allows the production of a white product.

The process as applied is carried out in two steps, as follows:

1. Production of an organic sulphoconjugated zinc salt.
2. Calcination of this salt in a closed space.

As the volatile substances are collected during the second step a fixed residue of zinc sulphide remains.

The organic salt used in this process may be of such composition that its calcination in a closed space furnishes a white product, but if it contains an excess of carbon the fixed residue obtained at the end of the second step is submitted at the end of the calcination to the action of air, to such extent that only the excess of carbon in the mass is burned. In such case the operation is carried out at a temperature which does not allow the oxidation of ZnS into $ZnSO_4$.

For the preparation of the sulphoconjugated zinc salt, the following two methods may be used, the second of these being preferable:

1. The salt is prepared, isolated and then pyrogenated in the presence of $ZnSO_4$.
2. The different substances such as anthracene, $H_2SO_4$ and $ZnSO_4$ are mixed and formed into a pasty mass under heat and agitation. This paste is then calcined in a furnace. The sulphoconjugated zinc salt is destroyed as soon as formed, allowing the production of ZnS and thus making it unnecessary to isolate the sulphoconjugated zinc salt before pyrogenation.

Benzene, naphthalene, anthracene and their sulphonic derivatives may be used for this preparation; but it is also possible to use organic substances not belonging to the cyclic series, such for example as cellulosic material, a particular suitable substance being sawdust. Cellulosic substances, when submitted to contact with concentrated sulfuric acid give products capable of use in the process.

These substances are capable of giving complex organic zinc salts which by pyrogenous treatment leave a fixed residue of zinc sulphide.

The following particulars are given as an illustration of how this process may be carried out:

160 kilos $ZnSO_4$, 95 kilos dry sawdust and 120 kilos $H_2SO_4$ are mixed and the mixture is heated and agitated. When a thick paste is obtained the mixture is moulded into bricks. These bricks are calcined at a high temperature in a closed space. The resulting product is zinc sulphide.

Charcoal may be employed in place of sawdust, if it is desired.

When the reaction of sulphuric acid on sawdust, or similar materials, takes place in the first stage of the reaction, sulphurous acid is evolved and can be recovered.

In many cases where it is desired to obtain a zinc sulphide for pigment it is advantageous to modify the process above described. This process then, as modified, may be divided into three steps as follows:

1. A mixture of zinc sulphate, sawdust or other carbonaceous substance, sulphuric acid and a sulphate of an alkaline metal or alkaline earth metal, or magnesium sulphate, is made in the desired proportions.
2. This mixture is heated to produce a complex substance of the general form $(ZnS)_a.(MgO)_b.(SO_4)_n.(Mg)_p$.
3. This complex substance is decomposed into ZnS and soluble sulphates which are recovered.

The following particulars are given to illustrate how the process may be carried out.

150 kilos $H_2SO_4$, 100 kilos sawdust, 246 kilos $SO_4Mg.7H_2O$, and 290 kilos $SO_4Zn.7H_2O$ are well mixed by agitation and heated. The resulting paste after being compressed is calcined in a muffle at a high temperature to obtain the complex substance indicated in step 2.

This substance is practically insoluble in boiling water and gives up only a very small quantity of sulphate. It is but little more soluble in hot water under pressure.

The formula of this substance varies with the proportions used in the mixture and with the degree of temperature during calcination. It approaches the form $(ZnS)_a (MgO)_b$ as the temperature goes up.

While the magnesia and magnesium sulphate may be progressively dissolved from such a complex by dis-association of the complex through repeated washings, it is preferable to proceed as follows:

The complex is put in suspension in water and agitated. A calculated quantity of diluted sulphuric acid is added. The magnesium sulphate is immediately dissolved and pure white zinc sulphide is liberated.

In this reaction, the sulfuric acid will first combine with the magnesia, before any substantial amount of it will act upon the zinc sulphide. This is especially true of zinc sulphide which has been calcined at a high temperature and which thereby becomes relatively resistant to chemical action.

The quantity of sulphuric acid is so regulated also as to dissolve the small quantity of zinc oxide which might be formed as well as the other impurities.

The acidulated washings are repeated until the soluble sulphates are eliminated.

The final product after filtration and subsequent drying is white-anhydrous and pure zinc sulphide.

After re-forming the initial $MgSO_4$ by the addition of $H_2SO_4$, barium chloride may be added thus forming barium sulphate.

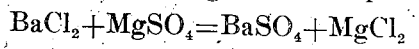

This reaction can be effected either partially or totally according to the quantity of barium sulphate desired in the zinc sulphide.

As zinc sulphide and barium sulphate are anhydrous on drying at 100 degrees the finished product may be obtained without any further calcination at high temperature.

It is also possible to calcine the complex above indicated in a furnace in an oxidizing atmosphere. The new complex obtained from such calcination in which the zinc sulphide has been changed into the oxide, is also insoluble. By saturating the sulphuric acid it is possible to obtain zinc oxide of the desired percentage according to the process described above.

In the original mixture zinc sulphate can be replaced by zinc oxide more or less pure, by taking into account the difference in molecular weight. It is possible in this way to obtain zinc oxide perfectly pure and white.

This process is also applicable to other metallic sulphates and especially to the alkali metal sulphates or alkali earth metal sulphates (sulphate of sodium, barium, etc.).

According to present practice (salt-cake furnace process) the yields in the reduction of a sulphate by coal are not satisfactory. Moreover after the furnace operation it is necessary to perform a further purification by physical means (dissolution, crystallization, etc.).

The partial result which is obtained in the salt-cake furnace process can be easily explained since it is due to the conditions of the reaction. In common practice carbon used is in the form of coal, that is, in a hard and nonreactive form, while in the present process the carbon is used in a molecularly fine state, and being in such state is highly reactive and hence possesses great reductive power. Moreover, the treatment by sulphuric acid converts the carbon used to a certain extent into compounds from which are given off reducing gases gradually during the heating. The treatment of sawdust with sulphuric acid depolymerizes the cellulose of the sawdust, and upon heating free carbon is formed. This carbon is accordingly much more active than the carbon of coal. This might be referred to as a "highly depolymerized condition."

The following is given as an example where $BaSO_4$ is used: $H_2SO_4$, 100; sawdust, 90; $BaSO_4$, 100.

This mixture, by calcination gives barium sulphide in a relatively high state of purity.

By this process the temperature necessary for the reaction is greatly reduced and furthermore the yields are greatly increased. In the case of sodium sulphide the concentrated product can be used as obtained, that is without the necessity of dissolution and crystallization, which is necessary in the prior practice to eliminate any excess of coal present. Instead of the sulphate it is possible to use other salts of an oxygenated acid of sulphur for example the sulphite, hyposulphite, bisulphite, polythionates, etc.

What I claim is:—

1. The process for manufacturing zinc sulphide which comprises calcining an organic sulphoconjugated zinc salt.

2. The process for manufacturing zinc sulphide which comprises calcining an organic sulphoconjugated zinc salt for the formation of which an organic complex substance is used.

3. The process for manufacturing zinc sulphide which comprises calcining zinc sulphate and an organic sulphonic substance.

4. The process for manufacturing zinc sulphide which comprises calcining a mixture of zinc sulphate, an organic material containing carbon and hydrogen and sulphuric acid.

5. The process for manufacturing zinc sulphide which comprises calcining a mixture of zinc sulphate, a carbonaceous substance and sulphuric acid.

6. The process for manufacturing zinc sulphide which comprises calcining a mixture of zinc sulphate, a carbonaceous material and sulphuric acid.

7. The process for manufacturing zinc sulphide which comprises mixing zinc sulphate, a carbonaceous material and sulphuric acid, heating and agitating and compressing the paste obtained and calcining it.

8. The process for manufacturing zinc sulphide which comprises mixing zinc sulphate, a carbonaceous substance and sulphuric acid, heating the mixture under agitation, compressing the paste obtained and calcining it.

9. The process for manufacturing zinc sulphide which comprises mixing zinc sulphate, a carbonaceous material, sulphuric acid and a metallic sulphate, calcining the mixture in a closed space, and decomposing the complex substance obtained into zinc sulphide and a soluble metallic sulphate.

10. The process for manufacturing zinc sulphide which comprises mixing zinc sulphate, a carbonaceous material, sulphuric acid and magnesium sulphate, heating this mixture, compressing the paste obtained, calcining the compressed paste in a closed space, and decomposing the complex substance obtained, by the treatment with an acid for liberating zinc sulphide and dissolving magnesium sulphate.

11. The process of manufacturing zinc sulphide which comprises mixing zinc sulphate, carbonaceous material, sulphuric acid and magnesium sulphate, heating this mixture, compressing the paste obtained, calcining the compressed paste in a closed space, and decomposing the complex substance obtained, by the treatment with an acid for liberating zinc sulphide and dissolving magnesium sulphate.

12. The process for manufacturing zinc sulphide which comprises mixing zinc sulphate, sawdust, sulphuric acid and magnesium sulphate, heating this mixture, compressing the paste obtained, calcining the compressed paste in a closed space, and decomposing the complex substance obtained, by the treatment with an acid for liberating zinc sulphide and dissolving magnesium sulphate.

13. The process for manufacturing zinc sulphide of a desired degree of purity which consists in mixing zinc sulphate, carbonaceous matter, sulphuric acid and a metallic sulphate, heating the mixture, compressing the paste obtained, calcining the compressed paste in a closed space, and decomposing the complex substance obtained, by the treatment with sulphuric acid for the liberation of zinc sulphide and dissolving the metallic sulphate.

14. The process for manufacturing zinc sulphide of a desired percentage of purity which comprises mixing zinc sulphate, carbonaceous matter, sulphuric acid and magnesium sulphate, heating the mixture, compressing the paste obtained, calcining the compressed paste in a closed space, and decomposing the complex substance obtained, by the treatment with sulphuric acid to liberate zinc sulphide and to dissolve magnesium sulphate.

15. The process for manufacturing metallic sulphides which comprises mixing a metallic sulphate, sulphuric acid and carbonaceous matter, heating, and calcining the mixture.

16. The process for manufacturing metallic sulphides which comprises mixing a metallic sulphate, sulphuric acid and a carbonaceous material, heating, and calcining the mixture.

17. The process for manufacturing metallic sulphides which comprises mixing a metallic salt of an oxygenated acid of sulphur, sulphuric acid and a carbonaceous material, heating, and calcining the mixture.

18. The process for manufacturing metallic sulphides, which comprises mixing a metallic salt of an oxygenated acid of sulphur, sulphuric acid and a carbonaceous material, heating, and calcining the mixture.

19. A step in the process of making a pure zinc sulphide from a double compound of zinc sulphide and magnesium oxide, which comprises reacting thereupon with dilute sulphuric acid to dissolve the magnesium oxide and to leave the zinc sulphide.

In testimony whereof we hereunto affix our signatures.

ANDRÉ HELBRONNER.
P. PIPEREAUT.